No. 685,471. Patented Oct. 29, 1901.
E. HERMITE & C. F. COOPER.
THERMO ELECTRIC COUPLE.
(Application filed Feb. 23, 1901.)
(No Model.) 2 Sheets—Sheet 1.
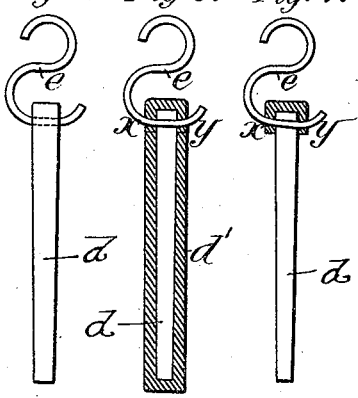
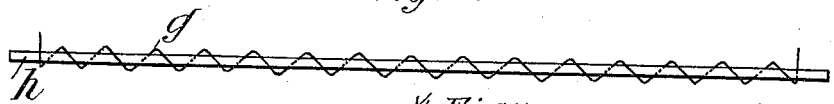
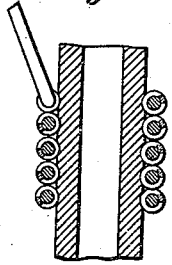
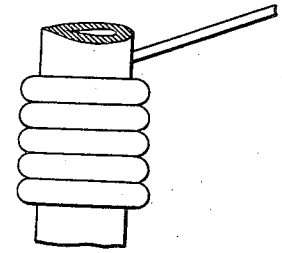
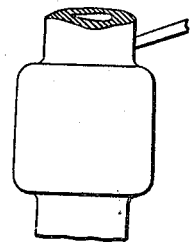
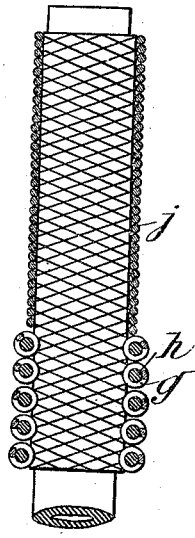
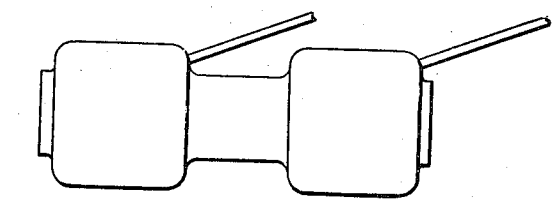
WITNESSES:
G. W. Wright
S. C. Cooper
INVENTORS
EUGÈNE HERMITE
CHARLES FRIEND COOPER
BY Howson and Howson
THEIR ATTORNEYS
THE NORRIS PETERS CO., PHOTO-LITHO., WASHINGTON, D. C.

No. 685,471. Patented Oct. 29, 1901.
E. HERMITE & C. F. COOPER.
THERMO ELECTRIC COUPLE.
(Application filed Feb. 23. 1901.)
(No Model.) 2 Sheets—Sheet 2.
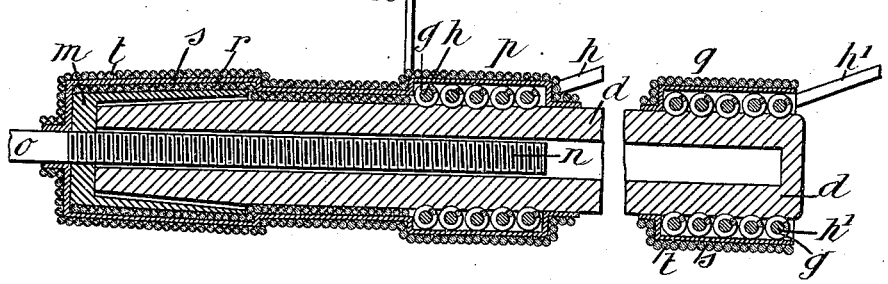
Fig. 13.
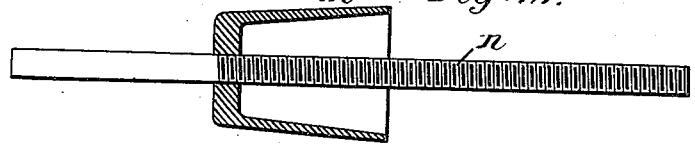
Fig. 14.
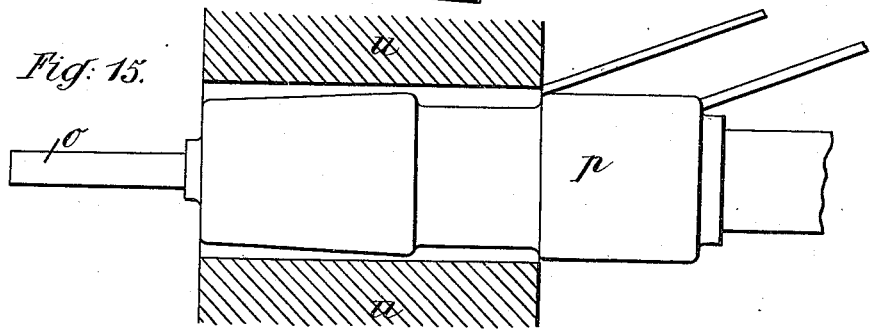
Fig. 15.
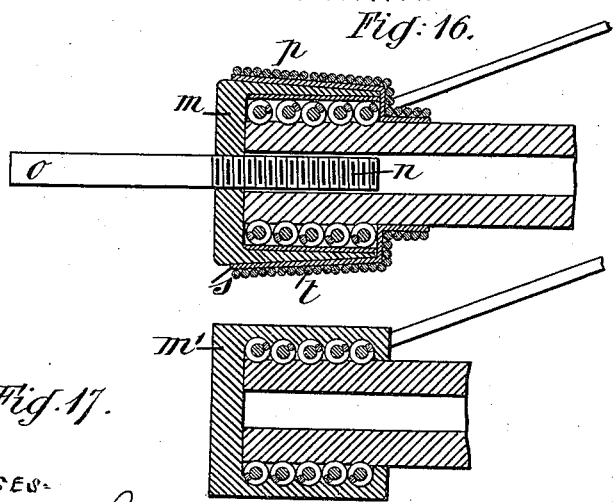
Fig. 16.
Fig. 17.
WITNESSES:
F. W. Wright
J. C. Connor
INVENTORS
EUGÈNE HERMITE
CHARLES FRIEND COOPER
BY
Howson and Howson
THEIR ATTORNEYS

UNITED STATES PATENT OFFICE.

EUGÈNE HERMITE AND CHARLES FRIEND COOPER, OF PARIS, FRANCE.

THERMO-ELECTRIC COUPLE.

SPECIFICATION forming part of Letters Patent No. 685,471, dated October 29, 1901.

Application filed February 23, 1901. Serial No. 48,462. (No model.)

*To all whom it may concern:*

Be it known that we, EUGÈNE HERMITE and CHARLES FRIEND COOPER, civil engineers, residing at 43 Rue de la Victoire, Paris, France, have invented an Improved and useful Thermo-Electric Couple, of which the following is a specification.

In 1827 Becquerel, père, showed that copper sulfid is strongly positive to ordinary copper, and he pointed out that thermo-electric couples of copper sulfid and copper yield electromotive forces greater than those yielded by any other bodies which he had tried, such as iron sulfid, manganese peroxid, &c. These researches were continued by Edmond Becquerel in 1865 and 1866. He showed that copper sulfid can be used for construction of thermo-electric couples in contact with copper or German silver, and he remarked that in order to obtain powerful effects the copper sulfid ought to be in a peculiar condition, and according to him the best means of obtaining it is to heat thick sheets of copper in sulfur-vapor, then to melt the copper sulfid thus obtained, and to cast it in molds at a temperature as nearly as possible to its melting-point. We have proved by our researches that in this last point he was in error. He thus obtained bars of sulfid having a fibrous fracture with bubbles disseminated through the mass. If the melting is repeated several times at a high temperature and if a homogeneous mass is cast, its thermo-electric power is nearly destroyed. In spite of all his precautions Becquerel did not always obtain bars giving the same electromotive force. Ruhmkorff stated that by adding to the copper sulfid a little antimony sulfid he obtained bars of a more regular thermo-electric power. Finally Becquerel, continuing his researches, found that by reheating his bars of melted copper sulfid for several hours their thermo-electric power became more regular. Becquerel constructed a thermo-electric battery in the laboratory with bars of fused copper sulfid thus obtained, covered at their ends with coils of copper or German-silver wire. This battery gave an electromotive force relatively much higher than that given by any other thermo-electric couple studied; but the internal resistance of the battery was so great that it was inappropriate for any practical use, and this investigation remained in the condition of laboratory researches. Such was the condition of this question when we turned our attention to it, and in the course of numerous practical researches we have come to the conclusion that copper sulfid properly prepared and coupled with certain metals is eminently fitted for the construction of industrial thermo-electric batteries.

The two great difficulties to overcome are, first, to obtain copper sulfid in a form virtually quite homogeneous and offering the least possible electric resistance and at the same time yielding a constant electromotive force variable for given temperatures, and, second, to make contacts between the copper sulfid and the metal employed which shall be indestructible by heat and at the same time suppressing all accidental or useless resistance to the passage of the electric current. Such are the industrial results to which we have come and which form the basis of the present patent application. The copper sulfid has never to our knowledge been referred to in a patent relating to a practical thermo-electric battery, and we are the first to show an industrial method of using it. For the sake of clearness we will divide our description into three parts: First, manufacture of the copper-sulfid pieces; second, contacts between the copper sulfid and the metals or alloys, and, third, construction of the thermo-electric couples.

Our invention is described with reference to the accompanying drawings, in which—

Figure 1 is a vertical section of a crucible in which is suspended a bar of copper undergoing treatment. Figs. 2 to 5 show, on an enlarged scale, the different steps of the manufacture of the piece. Figs. 6 and 7 explain the procedure for making the contacts by autogenous soldering. Fig. 8 shows in section, and Figs 9, 10, and 11 in elevation, a thermo-electric couple manufactured according to our process. Fig. 12 shows a variation of the method of soldering. Fig. 13 is a longitudinal section through a finished couple. Fig. 14 is a detail view of the ferrule and iron rod used for mounting the couple. Fig. 15 shows the couple placed in the wall of a furnace. Figs. 16 and 17 show variations of the method of mounting the hot contact of the couple.

*Manufacture of the copper-sulfid pieces.—*

In a crucible $a$, heated to redness and having in its cover $b$ a strong iron hook $c$, we suspend rods or bars of copper, preferably as pure as possible. It is convenient to pierce one of the ends of the copper bar $d$ and to suspend it to the hook $c$ by an S-shaped iron hook $e$, Figs. 1 and 2. When the copper has attained the same temperature as the crucible, we throw into the latter some sulfur and immediately close it. Theoretically for every one hundred parts, by weight, of copper, 25.21 parts of sulfur are necessary, the composition of copper sulfid being as follows: copper, 79.86 per cent.; sulfur, 20.14 per cent.; but as much sulfur-vapor is necessarily lost by escaping from the crucible during the operation we use a weight of sulfur at least equal to that of the copper. The sulfur combines with the copper, while the form of the bar is retained; but the volume of it is considerably increased, Fig. 3. At the end of the operation the bar of copper sulfid appears to be surrounded with a lambent blue flame, and when this blue flame has completely disappeared we stop the operation and allow the bar to cool out of contact with air. We now make a circular cut $x\,y$ at the end of the bar, Fig. 3, just beneath the hole through which the suspending-hook is passed and we easily withdraw from the center of the bar $d'$ of copper sulfid the small core $d$ of copper which has escaped sulfurization, but has preserved exactly the form of the original rod, Fig. 4. We have thus obtained a tube $d'$ of copper sulfid quite homogeneous, which may be easily polished by lightly rubbing it with emery-paper, Fig. 5. The thickness of the walls of this tube varies with the proportion of sulfur used and the temperature of the crucible.

By heating at a high enough temperature with a suitable proportion of the sulfur according to the thickness of the bar we can obtain bars of copper sulfid quite solid; but, as will be seen presently, we prefer to stop the operation after we have obtained tubes with thick walls and do not continue it until the bars are solid. The copper sulfid obtained in this manner is of perfect regularity, and when heated in contact with suitable metals—such as copper or its alloys, iron, German silver, platinum, &c.—it yields electromotive force constant for the temperature given and offers a resistance constant and regular to the electric current.

We can obtain bars or tubes of copper sulfid of any dimension and always regular. Moreover, before sulfurizing them, the copper bars may be shaped to any form which may be advantageous for mounting couples—that is to say, they may be pierced with holes or cavities may be cut in them of any form or dimensions, regard being had to the increase of volume during sulfurization and care being taken that it is possible to withdraw the copper core after sulfurization. In a word, the piece thus prepared is ready for industrial application and has no need of further preparation. This is not only a considerable saving of manual labor, but of great advantage, owing to the fact that copper sulfid is difficult to work and very brittle.

It must not be thought that it is a matter of indifference whether the copper core is left in its place or withdrawn after sulfurization. It is essential that it should be withdrawn, as otherwise the tube of copper sulfid would give a very feeble electromotive force and its resistance would be much increased, because the copper heats the whole length of the copper sulfid and necessitates a considerable distance between the two poles of the couple.

We give the foregoing example of sulfurization in a crucible only to explain our system, for we reserve the right to use furnaces or muffles of any form and any dimensions and to operate at any temperature. So, also, the vapor of sulfur may be supplied by any means, or hydrogen sulfid may be used, or any other combination of sulfur capable of forming copper sulfid under the conditions indicated. The form in which the copper is used is not a matter of indifference. Sheets of copper, for example, do not give such good results. Round bars are preferable, or bars having a square section or a regular polygonal section—that is to say, bars the surfaces of which are all of the same dimensions; but such bars do not give results equal to those obtained with round bars.

The copper sulfid is melted without regard to the temperature, except that the mass must be thoroughly liquid. The sulfid is then cast in molds of sand to give it the form desired in the construction of the couples. The pieces thus obtained are placed in a crucible or furnace and heated to redness, whereupon they are submitted to the action of sulfur-vapor for about half an hour. The piece absorbs regularly the sulfur and increases in volume. If the crucible or furnace is opened, the piece will be seen surrounded by the blue flame of burning sulfur. Before the complete disappearance of this flame the piece is withdrawn from the furnace and allowed to cool. In this condition the copper sulfid thus treated gives only a very weak electromotive force and has a high resistance to the electric current. It is therefore put back into a well-closed furnace and heated to bright redness for several hours with exclusion of air, care being taken to place in the furnace some ingots or sheets of copper to absorb the sulfur-vapor evolved from the piece. The latter is then allowed to cool slowly. After this operation the resistance is found to have fallen in considerable proportion, and every piece gives a perfectly regular electromotive force of from two-tenths to three-tenths of a volt, according to the temperature at which it is heated.

We have found that by adding to copper sulfid at the moment of its fusion a small proportion of iron sulfid we obtained pieces which resist strongly the action of the final roasting, which is very important. A good proportion of sulfid of iron to use is five per cent.; but we do not limit ourselves to this proportion.

*Contacts.*—One of the great difficulties in constructing a thermo-electric battery resides in the question of the contacts. In fact, this question, serious as it is in all applications of electricity, is still more complicated in thermo-electric batteries for the following reasons: It must be remembered, in the first place, that on account of the feeble electromotive force of each couple and owing to the considerable number of couples necessary to obtain a high electromotive force it is essential to multiply considerably the number of contacts notwithstanding the resistance entailed. Moreover, a very difficult matter is the fact that one of the poles of each couple must sustain a high temperature, so that there are expansions and contractions of the contacts at each change of temperature, and this is aggravated by the oxidation of the metals in contact in consequence of the high temperature. We have here one of the chief reasons why thermo-electric batteries have not succeeded hitherto. With copper sulfid the difficulty is increased by the fragile nature of the material and its comparatively high resistance. We have entirely overcome this great difficulty by help of our method of autogenous soldering, about to be described.

We have found that the most advantageous metals to use industrially in contact with copper sulfid in the construction of thermo-electric couples are copper, different varieties of German silver, silicon iron or steel or chrome iron or steel, platinum or platinum iridium, and, finally and chiefly, commercial brass. Brass oxidizes much less than copper when hot, and what is a remarkable fact, which we have discovered, it does not combine at a red heat with sulfur as copper does, so much so that if a brass wire $h$, Fig. 6, is wrapped around with a copper wire $g$ and both together are subjected at a red heat to the action of the sulfur-vapor the copper alone becomes sulfid, while the brass remains intact. In this way there is obtained a wire of copper sulfid wound around a wire of brass and in perfect contact therewith. We find that the same result can be obtained with iron, platinum, and German silver; but the two last-named metals are more costly than brass and do not offer any advantage. On this account we prefer brass. As to iron, this becomes sulfurized slightly at the same time as the copper and also exercises a slight chemical action on the copper sulfid when hot, not to mention that its electric resistance is much higher than that of brass. The discovery that copper may be transformed into sulfid on the surface of brass is the key to our method of preparing our contacts on the bars or tubes of copper sulfid in the manner already explained. The operation is conducted, preferably, in one of the four following manners:

First. On a wire or rod of brass $h$, Fig. 6, is wound a copper wire $g$, of the desired diameter, in coils more or less close together, as may suit the case. The compound wire thus prepared is wound on a bar of copper $d$, diagrammatically shown in Fig. 7, the coils being more or less close together and of greater or smaller number, according to the circumstances and the intensity of the electric current to be carried. The winding is done lightly without seeking to make a good contact, and the whole is then suspended in a crucible or furnace and sulfurized in the manner described at the beginning of the specification. The sulfur combines with the copper wire $g$, wound on the brass rod $h$, and also with the copper bar $d$. The whole swells, and the two copper sulfids, which while they are being formed are in a pasty state, weld together, imprisoning the brass wire or rod, which remains unchanged in the mass. There is thus formed a thick flange of copper sulfid on the tube or bar of copper sulfid obtained. There is, indeed, an actual autogenous soldering of the copper sulfid which enwraps the brass, making a perfect and solid contact with it. Such a soldered joint can be heated to redness and allowed to cool as often as may be desired without inconvenience. The soldering does not in any way increase the electric resistance of the copper-sulfid bar, and changes of temperature do not alter this resistance in any degree. Figs. 8 to 11 show a thermo-electric couple of copper-brass sulfurized and put together in the manner described.

Second. A rod of brass covered by a copper wire, as in the preceding case, is wound on one of our tubes or bars of copper sulfid already prepared in one or other of the methods described. The whole is placed in a crucible or furnace, heated to redness, and sulfurized, as usual. The copper surrounding the brass is sulfurized at the same time that the bar of copper sulfid softens, and the two sulfids are soldered together, inclosing the brass rod in the mass. This method permits the making of new contacts at any time on the tubes or bars of copper, and thus enables repairs to be made.

Third. A wire or rod of brass is simply wound around the copper bar to be sulfurized. During sulfurization the brass becomes completely surrounded by the sulfid and forms a perfect contact with the sulfid bar; but this contact is less solid than that previously described, and it is not possible to withdraw the copper core from the sulfurized bar, so that the sulfurization must go through to the center. This method, therefore, is adapted to the manufacture of solid sulfid bars by direct sulfurization. Care must be taken not to grasp the brass wire after the vapor of sulfur has come in contact with the copper.

Fourth. Around the bar of copper to be sulfurized, Fig. 12, is wound over a distance suitable for the purpose a brass netting $i$ of large mesh or a netting of mixed brass and copper threads, like a hood. Over this netting is wound a copper wire $j$, the coils of which are not in contact with each other, and the winding is finished by several turns of brass wire $h$, covered with copper wire $g$, and then the whole is sulfurized. After sulfurization the netting of brass is completely embedded in the sulfid and is solid, with the sulfid bar forming a perfect contact and a surface as large as may be desired. Sometimes the brass wire covered with copper is wound over the whole of the brass netting.

From the foregoing examples our method of making contacts will be completely understood. We give them solely as examples and do not limit ourselves thereto. We reserve the right to apply our method in any other manner and to use any other metal than brass capable of attaining the end in view and of giving a sufficient electromotive force in contact with copper sulfid while it resists the action of sulfur. In all cases after the soldering has been effected according to one or other of the methods described the pieces ought to be heated to bright redness, with exclusion of air during several hours, as was mentioned above when speaking of fused copper sulfid. This baking reduces the resistance and increases and regularizes the electromotive force. Copper must always be placed in the furnace to absorb the excess of sulfur exhaled from the couples.

*Mounting the couples in their protecting-casing.*—The thermo-electric couples made by the method hereinbefore described must be protected against the direct action of heat in order to avoid destruction of the copper sulfid, the said protection also giving them the solidity necessary for industrial work. By way of example some methods of mounting the couples of copper-sulfid brass are here described.

Fig. 13 shows a tube of copper sulfid manufactured according to our invention and of length suitable for the particular purpose. $p$ $q$ are the autogenously-soldered copper-sulfid-brass couples forming the two poles. $m$ is an iron ferrule, Fig. 14, lined with brass inside and provided with a steel rod $n$, which is screw-threaded and passes within the tube of copper sulfid without touching it. This rod extends into the tube only up to the end of the soldered joint $p$, as shown in Fig. 13. The purpose of this steel rod is to bring by conduction the heat into the copper-sulfid tube up to that part of it which is in contact with the brass and forms the hot joint. The screw-threads of the rod facilitate radiation of the heat. The end $o$ of the steel rod is thrust into the flame or the furnace which is to heat the couple. Around the ferrule $m$ is wound a brass wire $r$, and this is continued around the sulfid tube up to the joint $p$. Over this layer of brass wire is wrapped a layer of paper $s$, which is extended to cover the joint $p$. Instead of paper, asbestos fabric or a sheet of mica or any other bad conductor of heat and electricity and able to resist heat may be used. This last-named wrapper is covered with an iron or steel wire $t$, wound in very close coils to protect the whole. The joint $q$, forming the cold pole, is also protected by a wrapping of asbestos $s$ and by the iron or steel wire $t$. The ends of the wire $h$ are united and form the hot pole of the couple, the wire $h'$ being the cold pole.

Fig. 15 shows the couple illustrated in Fig. 13 placed in a brick of refractory material $u$, forming, for example, the wall of a furnace, the end $o$ of the steel rod $n$ being thrust into this furnace.

Fig. 16 shows another type of mounting, the hot pole of the couple being alone shown. Here the contact is formed by a certain length of autogenously-soldered joint covered by an iron ferrule $m$, with a screw-threaded steel rod $n$, one of the ends of which extends into the sulfid tube as far as the length of the hot joint, the other end $o$ being thrust into the furnace. The ferrule is covered with asbestos $s$, as in the preceding case, and is firmly held by the coils of steel wire $t$. The following methods may also be used with good results: When the couple has been made in the manner described by autogenously soldering a brass wire to each end of a bar of copper sulfid, this couple is placed in a mold, a cavity being left around the joint, which is to be the hot pole, or it may be around both ends, and into these cavities is cast brass, bronze, German silver, or any other suitable metal or alloy, taking care that the brass wire of the couple is surrounded by the cast metal or alloy. There is then obtained a protective coating $m'$, Fig. 17, which may be heated without detriment, to which it is easy to fix means of attachment by which the couples may be mounted. The following method is also applicable, and to it we attach great importance: The couples are plunged into melted iron sulfid, so that they become coated with a covering of this material, which, as is known, is indestructible by heat and even by baking, or the couples are placed in molds and sulfid of iron is cast around them, or instead of sulfid of iron a mixture of this with copper sulfid, which is also unalterable by heat, may be used in the proportion of fifty of copper sulfid to fifty of iron sulfid, for example. The couples are thus surrounded by an envelop which is indestructible by heat.

We find that in certain cases it is of advantage to strengthen the joints of the poles in the following manner: When the couple has been constructed according to the aforesaid method of autogenously soldering, either the whole couple or its two ends only are dipped into melted and thoroughly-liquid copper sulfid, whereby the couple or its extremities are covered by a new layer of copper sulfid surrounding the first soldered joint and giving it solidity while augmenting the conductivity, or the couple may be in a mold, and melted copper sulfid may be cast either over the whole or only over the two ends, care being taken that the ends of the brass wires protrude from the mold in order that contact may be established. This extra layer of copper sulfid protects the original joints, and the whole is thus made very solid. This layer of sulfid of copper is finally protected against roasting by one of the means indicated above. The couples may also be protected from roasting by covering them with an enamel capable of resisting heat, such as the enamel used to cover iron cooking utensils or hard pottery.

As has already been stated, these details of mounting the couples are solely by way of example, and we reserve to ourselves the right to vary these details. It remains to say what number of these elements is necessary to produce the tension and quantity required for obtaining the desired electric current and electromotive force. When this is known, the thermo-electric battery may be completed. The couples hereinbefore described each gives on open circuit an electromotive force of from 0.2 to 0.3 of a volt, according to the temperature employed and without any danger that they will be destroyed.

We claim as our invention—

1. The herein-described process of manufacturing a copper-sulfid tube for thermo-electric couples, consisting of placing the rod on which the sulfid is to be formed and means for producing sulfur-vapor in a closed vessel and applying heat to cause the sulfur to form a covering of copper sulfid thereon and then withdrawing the core.

2. The herein-described process of manufacturing a copper-sulfid tube for thermo-electric batteries, said process consisting in subjecting a copper rod to the action of sulfur-vapors to form a covering of copper sulfid thereon and then withdrawing the copper core, substantially as described.

3. The herein-described process of manufacturing a copper-sulfid tube for thermo-electric batteries, said process consisting in subjecting a copper rod and sulfur to heat in a closed vessel, whereby the sulfur combines with the copper and forms a covering of copper sulfid thereon and then withdrawing the copper core, substantially as described.

4. The herein-described process of forming the electrical connection of thermo-electric couples, consisting of first applying to the core of the couple a metal not sulfurizable, then subjecting them to sulfur-vapors as described to cause the non-sulfurizable metal to become embedded in the resulting mass of the core.

5. The herein-described process of forming the electrical connection of thermo-electric couples, consisting of applying a metal non-sulfurizable and one sulfurizable intimately together, then applying them to the core of the couple and subjecting them to sulfur-vapors as described, to cause the applied metals to thoroughly unite with and become embedded with the material of the core.

6. The herein-described process of forming the electrical connections of thermo-electric couples, consisting of forming on the core of the couple a winding of brass wire and then subjecting the wound couple to sulfur-vapor, as described.

7. The herein-described process of forming the electrical connections of thermo-electric couples, consisting of first wrapping a copper wire on one of brass, and then winding the compound wire produced, on the core of the couple and subjecting it to sulfur-vapor, as described.

8. The herein-described electrical connection for thermo-electric couples, comprising a copper-sulfid core, and a connection of metal non-sulfurizable embedded with said core in an outer covering of copper sulfid, substantially as described.

9. The herein-described connection for a thermo-electric couple, comprising a copper-sulfid core, and connection of metals in intimate connection, one sulfurizable and one not sulfurizable, said metals being embedded with the core in an outer covering of copper sulfid, substantially as described.

10. The herein-described electrical connection for a thermo-electric couple, consisting of a copper-sulfid core, a winding of brass wire, with copper wire wound thereon embedded with the core and a covering of copper sulfid surrounding the whole, substantially as described.

11. A thermo-electric couple, comprising a tube of copper sulfid, combined with another metal, substantially as described.

12. A thermo-electric couple comprising a hollow core of copper sulfid, connecting-wires wound thereon, an extending end for that end of the couple that is to be heated and a metal rod in said end to conduct the heat the required distance in the core, substantially as described.

13. A thermo-electric couple, comprising a hollow core of copper sulfid, connecting-wires embedded therein at a distance from the end to be heated, a rod in the core, a ferrule at the end of the core, the whole being inclosed in a non-conducting covering and a winding of wire on the outside of said covering to protect the couple, substantially as and for the purpose described.

In testimony whereof we have signed our names to this specification in the presence of two subscribing witnesses.

EUGÈNE HERMITE.
CHARLES FRIEND COOPER.

Witnesses:
CHARLES DONY,
EDWARD P. MACLEAN.